(12) United States Patent
Krishnan et al.

(10) Patent No.: US 10,824,538 B2
(45) Date of Patent: Nov. 3, 2020

(54) SCALABLE INCREMENTAL ANALYSIS USING CALLER AND CALLEE SUMMARIES

(71) Applicant: Oracle International Corporation, Redwood Shores, CA (US)

(72) Inventors: Padmanabhan Krishnan, Brisbane (AU); Rebecca Jane O'Donoghue, Brisbane (AU); Nicholas John Allen, Westlake (AU); Yi Lu, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/253,957

(22) Filed: Jan. 22, 2019

(65) Prior Publication Data

US 2020/0233777 A1   Jul. 23, 2020

(51) Int. Cl.
*G06F 11/36* (2006.01)
*G06F 21/57* (2013.01)

(52) U.S. Cl.
CPC .......... *G06F 11/3612* (2013.01); *G06F 21/57* (2013.01); *G06F 2221/033* (2013.01)

(58) Field of Classification Search
CPC . G06F 11/3612; G06F 21/57; G06F 2221/033
USPC .................................................. 717/120–161
See application file for complete search history.

(56) References Cited

U.S. PATENT DOCUMENTS

| | | | | |
|---|---|---|---|---|
| 5,293,631 A | * | 3/1994 | Rau | G06F 8/445 717/146 |
| 8,190,807 B2 | * | 5/2012 | Reid | G06F 11/3636 711/3 |
| 8,255,891 B2 | * | 8/2012 | Chen | G06F 8/433 717/155 |

(Continued)

OTHER PUBLICATIONS

Lundberg, Jonas, and Welf Löwe. "A scalable flow-sensitive points-to analysis."Compiler Construction—Advances and Applications, Festschrift on the occasion of the retirement of Prof. Dr. Dr. hc Gerhard Goos, Lecture Notes in Computer Science (LNCS), to appear in;(2007),pp. 1-29. (Year: 2007).*

(Continued)

*Primary Examiner* — Satish Rampuria
(74) *Attorney, Agent, or Firm* — Ferguson Braswell Fraser Kubasta PC

(57) ABSTRACT

A method may include generating, by performing a full analysis of code and for each component of the code, summaries including: a forward summary including a forward flow, and a backward summary including a backward flow, obtaining a modification to a modified component, determining that one of the summaries for the modified component is invalid, and in response to determining that a summary for the modified component is invalid: obtaining the forward flow from the forward summary of the modified component, obtaining the backward flow from the backward summary of the modified component, generating a local flow by performing an incremental analysis of the modified component using the forward flow of the modified compo- (Continued)

nent and the backward flow of the modified component, and detecting a defect in the code using the forward flow of the modified component, the local flow, and the backward flow of the modified component.

17 Claims, 6 Drawing Sheets

(56) References Cited

U.S. PATENT DOCUMENTS

| | | | | |
|---|---|---|---|---|
| 8,336,034 B2* | 12/2012 | Sinha | ................ | G06F 11/3608 714/38.1 |
| 8,365,152 B2* | 1/2013 | Balakrishnan | ...... | G06F 11/3608 717/138 |
| 8,621,443 B2* | 12/2013 | Miura | ................ | G06F 9/45504 717/136 |
| 8,701,098 B2* | 4/2014 | Roediger | ................ | G06F 8/41 717/154 |
| 8,762,949 B2* | 6/2014 | Conway | ................ | G06F 8/73 717/126 |
| 9,477,577 B2* | 10/2016 | Baca | ................ | G06F 11/3612 |
| 2007/0006151 A1* | 1/2007 | Conway | ................ | G06F 8/73 717/120 |
| 2011/0271246 A1* | 11/2011 | Fujihara | ................ | G06F 8/20 717/104 |
| 2016/0048378 A1* | 2/2016 | Varma | ................ | G06F 8/443 717/141 |

OTHER PUBLICATIONS

Yur, Jyh-Shiarn;Incremental Analysis for Flow-and Context-Sensitive Data-Flow Problems. Diss. 1999, pp. 1-103. (Year: 1999).*

Krishnan, Padmanabhan, et al. "Commit-time incremental analysis." Proceedings of the 8th ACM SIGPLAN International Workshop on State of the Art in Program Analysis. ACM, 2019,pp. 26-31 (Year: 2019).*

Göde, Nils, and Rainer Koschke. "Incremental clone detection." 2009 13th European Conference on Software Maintenance and Reengineering. IEEE, 2009.pp. 219-228. (Year: 2009).*

Wagner, Tim A., and Susan L. Graham. "Incremental analysis of real programming languages." ACM SIGPLAN Notices 32.5 (1997): pp. 31-43. (Year: 1997).*

Bloom, S. C., et al. "Data assimilation using incremental analysis updates." Monthly Weather Review 124.6 (1996): pp. 1256-1271. Year: 1996).*

Hermenegildo, Manuel V., et al. "Incremental Analysis of Logic Programs." ICLP. 1995. pp. 797-811. (Year: 1995).*

Tai, Kuo-Chung, and Pramod V. Koppol. "An incremental approach to reachability analysis of distributed programs." Proceedings of 1993 IEEE 7th International Workshop on Software Specification and Design. IEEE, 1993. pp. 141-150. (Year: 1993).*

Marlowe, Thomas J., and Barbara G. Ryder. "An efficient hybrid algorithm for incremental data flow analysis." Proceedings of the 17th ACM SIGPLAN-SIGACT symposium on Principles of programming languages. 1989.pp. 184-196. (Year: 1989).*

Arzt, Steven et al., "Reviser: Efficiently Updating IDE-/IFDS-Based data-flow analyses in Response to Incremental Program Changes"; In Proceedings of the 36th International Conference on Software Engineerin (ICSE), May 31-Jun. 7, 2014, pp. 288-298 (11 pages).

Krainz, Jakob et al., "Diff Graphs for a Fast Incremental Pointer Analysis"; In Proceedings of the 12th Workshop on Implementation, Compilation, Optimization of Object-Oriented Languages, Programs and Systems (ICOOOLPS), Jun. 19, 2017; Article No. 4, pp. 4:1-4:10; (10 pages).

Lu, Yi et al., "An incremental Points-to Analysis with CFL Reachability"; In Proceedings of the 22nd International Conference on Compiler Construction, Mar. 16-24, 2013, pp. 61-81 (20 pages).

Madhavan, R. et al., "Modular Heap Analysis for Higher-Order Programs"; In International Static Analysis Symposium (SAS), Sep. 11-13, 2012; LNCS vol. 7460, Sep. 11, 2012, pp. 370-387 (18 pages).

Mudduluru, R. et al., "Efficient Incremental Static Analysis Using Path Abstraction"; In 17th International Conference on Fundamental Approaches to Software Engineering (FASE), Apr. 5-13, 2014; LNCS vol. 8411, pp. 125-139 (15 pages).

Jenkins, J., et al, "Leveraging Historical Versions of Android Apps for Efficient and Precise Taint Analysis", 2018 IEEE/ACM 15th International Conference on Mining Software Repositories (MSR), May 27, 2018, 5 pages.

Cai Haipeng et al, "Method-Level Program Dependence Abstraction and Its Application to Impact Analysis", Journal of Systems and Software, Sep. 28, 2016, 16 pages.

Steve Arzt, et al., "Reviser: Efficiently Updating IDE-IFDS-Based Data-Flow Analyses in Response to Incremental Program Changes", Software Engineering, ACM, May 31, 2014, 11 pages.

Gauthier Francois, et al., Scalable Static Analysis to Detect Security Vulnerabilities: Challenges and Solutions, IEEE Cyber Security Development, Sep. 30, 2018, 1 page.

Padmanabhan Krishnan et al., "Commit-Time Incremental Analysis", Proceedings of the 8th ACM Sigplan International Workshop on State of the Art in Program Analysis, Jun. 22, 2019, 6 pages.

PCT International Search Report for PCT/US2019/069105, dated Mar. 31, 2020, 4 pages.

PCT Written Opinion of the International Searching Authority, for PCT/US2019/069105, dated Mar. 31, 2020, 12 pages.

\* cited by examiner

SCALABLE INCREMENTAL ANALYSIS USING CALLER AND CALLEE SUMMARIES

BACKGROUND

Typically, only a small portion of a codebase will be modified. Thus, it is inefficient to analyze the entire codebase for each code change. For example, the analysis may be a security analysis (e.g., taint or escape analyses) to detect security vulnerabilities in web applications and services. The standard approach typically uses backward summaries that describe dataflows between the changed code and components called by the changed code. With the standard approach, the changed code, in addition to all callers of the changed code, are analyzed in response to a change.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including generating, by performing a full analysis of code and for each component of the code, summaries including: (i) a forward summary including a forward flow and (ii) a backward summary including a backward flow, obtaining a modification to a modified component, determining that one of the summaries for the modified component is invalid, and in response to determining that one of the summaries for the modified component is invalid: obtaining the forward flow from the forward summary of the modified component, obtaining the backward flow from the backward summary of the modified component, generating a local flow by performing an incremental analysis of the modified component using the forward flow of the modified component and the backward flow of the modified component, and detecting a defect in the code using the forward flow of the modified component, the local flow, and the backward flow of the modified component.

In general, in one aspect, one or more embodiments relate to a system including a memory coupled to a computer processor, a repository configured to store code original source code including components each including summaries including (i) a forward summary including a forward flow and (ii) a backward summary including a backward flow, and a code analyzer, executing on the computer processor and using the memory, configured to generate the summaries for each component of the code by performing a full analysis of the code, obtain a modification to a modified component, determine that one of the summaries for the modified component is invalid, and in response to determining that one of the summaries for the modified component is invalid: obtain the forward flow from the forward summary of the modified component, obtain the backward flow from the backward summary of the modified component, generate a local flow by performing an incremental analysis of the modified component using the forward flow of the modified component and the backward flow of the modified component, and detect a defect in the code using the forward flow of the modified component, the local flow, and the backward flow of the modified component.

In general, in one aspect, one or more embodiments relate to a non-transitory computer readable medium including instructions that, when executed by a computer processor, perform: generating, by performing a full analysis of code and for each component of the code, summaries including: (i) a forward summary including a forward flow and (ii) a backward summary including a backward flow, obtaining a modification to a modified component, determining that one of the summaries for the modified component is invalid, and in response to determining that one of the summaries for the modified component is invalid: obtaining the forward flow from the forward summary of the modified component, obtaining the backward flow from the backward summary of the modified component, generating a local flow by performing an incremental analysis of the modified component using the forward flow of the modified component and the backward flow of the modified component, and detecting a defect in the code using the forward flow of the modified component, the local flow, and the backward flow of the modified component.

Other aspects of the invention will be apparent from the following description and the appended claims.

DETAILED DESCRIPTION

Figure 1A:
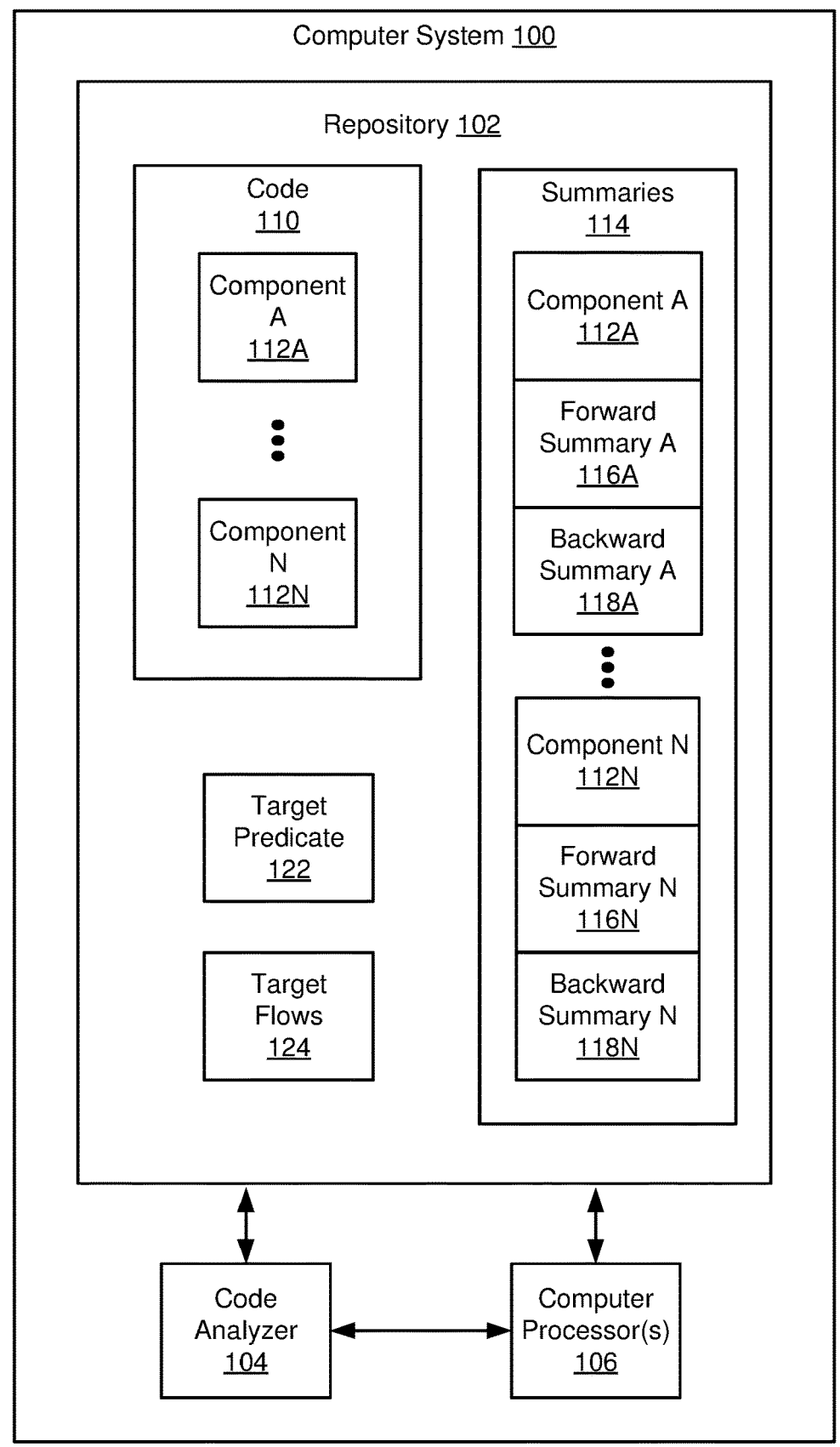
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method, system, and computer-readable medium for incremental analysis of code. In one or more embodiments, while performing a full analysis of the code to identify security vulnerabilities, forward and backward summaries for each component (e.g., method or function) of the code are generated. The forward summary describes dataflows between the component and its callers, and the backward summary describes dataflows between the component and its callees. In one or more embodiments, the incremental analysis identifies new security vulnerabilities by analyzing local dataflows within a modified component of the code using the forward and backward summaries of the modified component. The incremental analysis may also determine whether existing security vulnerabilities identified by the full analysis are corrected by the modified component. The incremental analysis is scalable to large codebases due to its focus on dataflows of relevance to the security analysis (e.g., taint flows, escape flows, etc.), thus reducing the sizes of the summaries.

FIG. 1A shows a computer system (100) in accordance with one or more embodiments of the invention. As shown in FIG. 1A, the computer system (100) includes a repository (102), a code analyzer (104), and one or more computer processors (106). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (106) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes code (110), summaries (114), a target predicate (122), and target flows (124). In one or more embodiments, the code (110) is a collection of source code. The code (110) may include a collection of computer instructions written in a programming language, or intermediate representation (e.g., byte code). In one or more embodiments, the collection of computer instructions may construct and/or reference various objects.

In one or more embodiments, the code (110) includes components (112A, 112N). In one or more embodiments, a component (112A) is a unit of source code. Programming entities defined within a component (112A) may be imported by other components. For example, the programming entities may be files, packages, classes, functions, etc.

In one or more embodiments, the summaries (114) include forward summaries (116A, 116N) and backward summaries (118A, 118N) for components (112A, 112N). Each component (112A) may be associated with a forward summary (116A) and a backward summary (118A). The component (112A) may be referred to as the "owner" of the associated forward summary (116A) and backward summary (118A). In one or more embodiments, the forward summaries (116A, 116N) and backward summaries (118A, 118N) summarize parameter flows between two components, one of which is the owner of the associated summaries.

Figure 1B:
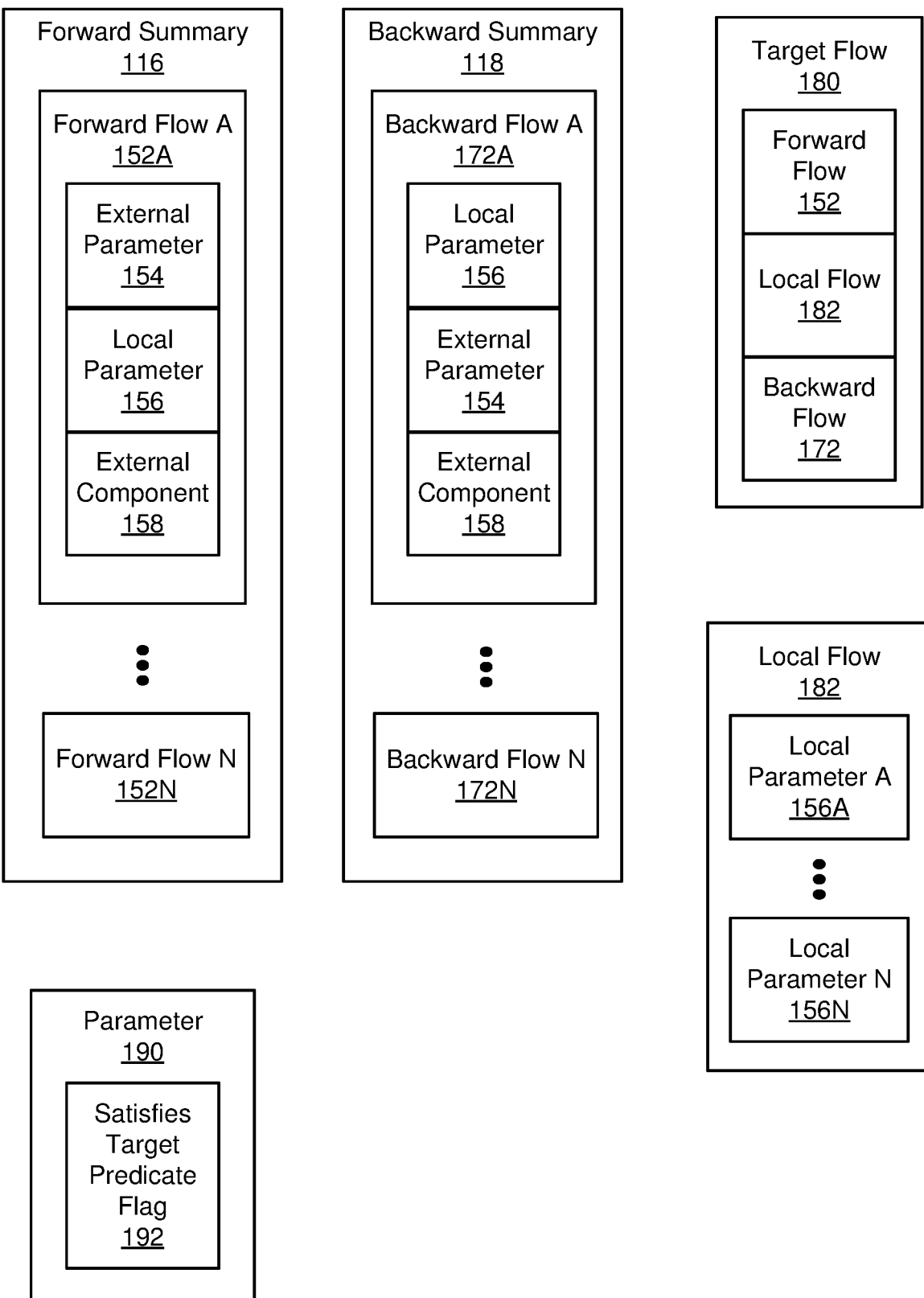

Turning to FIG. 1B, in one or more embodiments, a forward summary (116) includes one or more forward flows (152A, 152N). A forward flow (152A) may describe a flow between an external parameter (154) and a local parameter (156). The forward flow (152A) may occur in either direction, from the external parameter (154) to the local parameter (156), or vice-versa. In one or more embodiments, the external parameter (154) is associated with an external component (158) different from the owner component that owns the forward summary (116). The external parameter (154) may satisfy the target predicate (122). For example, when the analysis of the code (110) is a taint analysis, the target predicate (122) may indicate whether a parameter receives a tainted value. Continuing this example, the tainted value may correspond to a user-supplied or externally generated value (e.g., an unknown value that is potentially controlled by an attacker). The external parameter (154) may receive the tainted value directly from an external source. Alternatively, the external parameter (154) may receive the tainted value via a taint flow (e.g., via a series of function calls that transmit the tainted value from the external source). In one or more embodiments, when the analysis of the code (110) is an escape analysis, the target predicate (122) may indicate whether a parameter is an escape point corresponding to the release of sensitive (e.g., confidential) data.

In one or more embodiments, the local parameter (156) is a variable associated with the owner component that owns the forward summary (116). For example, the local parameter (156) may be a formal parameter or local variable of the owner component.

In one or more embodiments, the external component (158) may be a component that provides the external parameter (154) to the owner component. For example, the external component (158) may provide the value of the external parameter (154) as a return value or side effect. In one or more embodiments, the external component (158) is omitted because the forward flow (152A) occurs within a single component (e.g., the owner component may be a file or package that both provides and receives the external parameter (154)).

In one or more embodiments, a backward summary (118) includes one or more backward flows (172A, 172N). A backward flow (172A) may describe a flow between a local parameter (156) and an external parameter (154). The backward flow (172A) may occur in either direction, from the local parameter (156) to the external parameter (154), or vice-versa. In one or more embodiments, the external parameter (154) is associated with an external component (158) different from the owner component that owns the backward summary (118). In one or more embodiments, the local parameter (156) is a variable associated with the owner component that owns the backward summary (118).

In one or more embodiments, the external component (158) may be a component that receives a local parameter (156) (e.g., corresponding to a potentially tainted value) from the owner component. For example, the external component (158) may be a component that accesses a security-sensitive resource of the computer system (100). Alternatively, the external component (158) may transmit the tainted value to another component that accesses a security-sensitive resource via a taint flow.

The external component (158) may receive a local parameter (156) (e.g., as a function argument) corresponding to a potentially tainted value from the owner component, which may represent a security flaw relative to a taint analysis. Alternatively, the external component (158) may be a component that provides an external parameter (154) (e.g., corresponding to a potentially sensitive, confidential value) to the owner component. In one or more embodiments, the external component (158) is omitted because the backward flow (172A) occurs within a single component (e.g., the owner component may be a file or package that both provides and receives the external parameter (154)).

In one or more embodiments, the target predicate (122) is a predicate that, when satisfied, indicates the presence of a condition of interest to an analysis of the code (110). For example, in the context of a security analysis, the target predicate (122) may indicate whether a parameter is tainted (e.g., in the context of a taint analysis), or represents sensitive data (e.g., in the context of an escape analysis). Continuing this example, a taint analysis may specify a list of source functions that receive potentially tainted data (e.g., from a user or an external source). Similarly, an escape analysis may specify a list of source functions (e.g., with elevated access privileges) that receive potentially sensitive data. In addition, the taint analysis may specify a list of sink functions that access a security-sensitive resource of the computer system (100). Similarly, the escape analysis may specify a list of sink functions that permit unrestricted (e.g., unprivileged) access to data and thus represent information leakage points. The taint analysis may further specify a list of modifier functions that sanitize tainted data to render the tainted data harmless. Similarly, an escape analysis may specify a list of modifier functions that declassify (e.g., redact) sensitive data.

Returning to FIG. 1A, in one or more embodiments, target flows (124) indicate data flows relevant to the target predicate (122). For example, in the context of a security analysis, the target flows (124) may indicate how parameters becomes tainted, or release sensitive data. Thus, the target flows (124) may correspond to defects in the code (110). Returning to FIG. 1B, in one or more embodiments, a target flow (180) includes a forward flow (152), a local flow (182), and a backward flow (172). The local flow (182) may describe the flow among local parameters (156A, 156N) of the owner component. The local flow (182) may serve as a bridge that connects the forward flow (152) to the backward flow (172). In other words, the local flow (182) may indicate how the flow of values occurs between the external (e.g., tainted) parameter of the forward flow (152) and the external parameter of the backward flow (172).

In one or more embodiments, a parameter (190) includes a satisfies target predicate flag (192) indicating the status of the parameter (190) relative to the target predicate ((122) in FIG. 1A). For example, the satisfies target predicate flag (192) may be true or false, depending on whether the parameter (190) satisfies the target predicate.

Returning to FIG. 1A, in one or more embodiments, the code analyzer (104) may be implemented in hardware (e.g., circuitry), software, firmware, and/or any combination thereof. In one or more embodiments, the code analyzer (104) includes functionality to perform a static analysis of the code (110). In one or more embodiments, the static analysis is a method of analyzing the code (110) without executing the code (110). For example, the goal of the static analysis may be to identify potential coding defects, security flaws, and/or malicious code.

In one or more embodiments, the code analyzer (104) includes functionality to generate forward summaries (116A, 116N) and backward summaries (118A, 118N) for components (112A, 112N). The code analyzer (104) may include functionality to perform an incremental analysis of the impact of a modification to a component (112A). The code analyzer (104) may include functionality to detect defects in the code (110) using a forward summary (116A), backward summary (118A), and the incremental analysis of a modified component (112A).

In one or more embodiments, the computer processor (106) includes functionality to execute the code (110). In one or more embodiments, the computer processor (106) includes functionality to execute the code analyzer (104).

While FIG. 1A shows a configuration of components, other configurations may be used without departing from the scope of the invention. For example, various components may be combined to create a single component. As another example, the functionality performed by a single component may be performed by two or more components.

Figure 2:
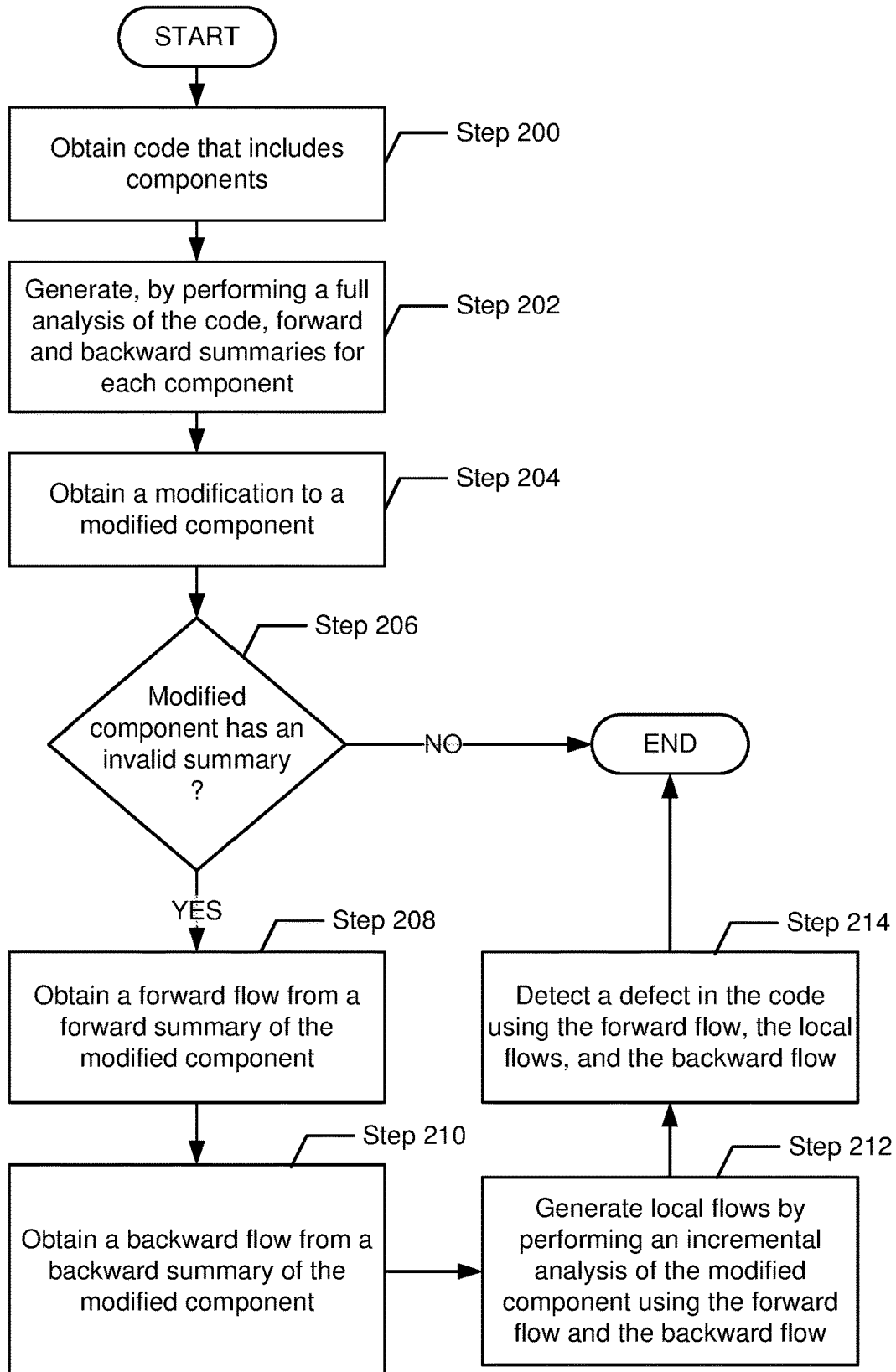
FIG. 2 shows a flowchart in accordance with one or more embodiments of the invention.

FIG. 2 shows a flowchart in accordance with one or more embodiments of the invention. The flowchart depicts a process for incremental analysis. One or more of the steps in FIG. 2 may be performed by the components (e.g., the code analyzer (104) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, code is obtained. The code may be obtained from a repository, such as a source code version control system (e.g., GitHub). The code may include multiple components.

In Step 202, forward and backward summaries are generated for each component by performing a full analysis of the code. The full analysis of the code may be a static analysis of each component. In one or more embodiments, the static analysis generates a forward summary for the component by identifying forward flows that include an external parameter and a local parameter of the component. Similarly, the static analysis may generate a backward summary for the component by identifying backward flows that include an external parameter and a local parameter of the component. Focusing the generation of forward summaries on flows whose parameters satisfy a target predicate both reduces the size of the forward summaries and improves the efficiency of forward summary generation, thus permitting forward summary generation to scale to large codebases.

Each summary may be stored in a repository. In one or more embodiments, the summaries are indexed by the name of the corresponding component(s).

In one or more embodiments, the full analysis generates results that include target flows. The code analyzer may report each target flow as a potential defect in the code. In one or more embodiments, the report includes each parameter included in the target flow. However, if the target flow includes a parameter that is modified by a modifier function (e.g., a sanitizer or declassifier), then the code analyzer may determine that the target flow does not correspond to a defect, due to the effect of the modifier.

In Step 204, a modification to a modified component is obtained. For example, the modification may add, delete, or modify one or more statements in the component. In one or more embodiments, the modification may be obtained by comparing a new version of the component to a previous version of the component. For example, the modification may be received from a source code version control system that maintains multiple versions of the code. Continuing this example, a source code version control system may provide a list of modifications for components modified in a commit operation that creates a new version of the code.

If, in Step 206, a determination is made that that a summary for the modified component is invalid, then Step 208 below is executed. In one or more embodiments, a summary is determined to be invalid when the modification modifies a target flow included in the results of the full analysis in Step 202 above. For example, if the modification modifies a statement that accesses a parameter included in the target flow, then the target flow might no longer be valid. Continuing this example, the modification may change the target predicate status of the parameter to indicate that the parameter no longer satisfies a target predicate, and thus a defect detected during the full analysis might no longer be present. In addition, the summary may be invalid because the summary does not reflect a new target flow resulting from the modification.

Otherwise, if in Step 206 a determination is made that all summaries for the modified component are valid, the process ends.

In Step 208, a forward flow from the forward summary of the modified component is obtained. For example, the forward summary may be obtained from a repository using the name of the modified component.

In Step 210, a backward flow from the backward summary of the modified component is obtained. For example, the backward summary may be obtained from a repository using the name of the modified component.

In Step 212, a local flow is generated by performing an incremental analysis of the modified component using the forward flow of the modified component and the backward flow of the modified component. The modified component may be the only component to be analyzed by the incremental analysis. In one or more embodiments, the incremental analysis generates a local flow among local parameters of the modified component. The local flow may begin with the forward flow of the modified component and end with the backward flow of the modified component.

In Step 214, a defect in the code is detected using the forward flow of the modified component, the local flow, and the backward flow of the modified component. In one or more embodiments, the defect corresponds to a new target flow corresponding to the forward flow of the modified component, the local flow, and the backward flow of the modified component. The local flow within the modified component generated in Step 212 above may connect the forward flow to the backward flow to form the new target flow.

The code analyzer may report the new target flow as a new potential defect in the code (e.g., a new potential defect that was not present in the results of the full analysis of Step 202 above). In addition, as described above in Step 206, a target flow included in the results of the full analysis might no longer be valid due to the modification, in which case the code analyzer may report the invalidated target flow. For example, a defect corresponding to the invalidated target flow may have been corrected by adding a modifier function (e.g., to sanitize or declassify a parameter) to the modified component.

Benchmarks have shown that the cost of generating forward and backward summaries during the full analysis may be recovered by performing approximately two incremental analyses. In addition, the incremental analyses using forward and backward summaries were several times faster than a standard incremental analysis that used only backward summaries, since the standard incremental analysis required analyzing the callers of the modified component, in addition to analyzing the modified component.

Figure 3:
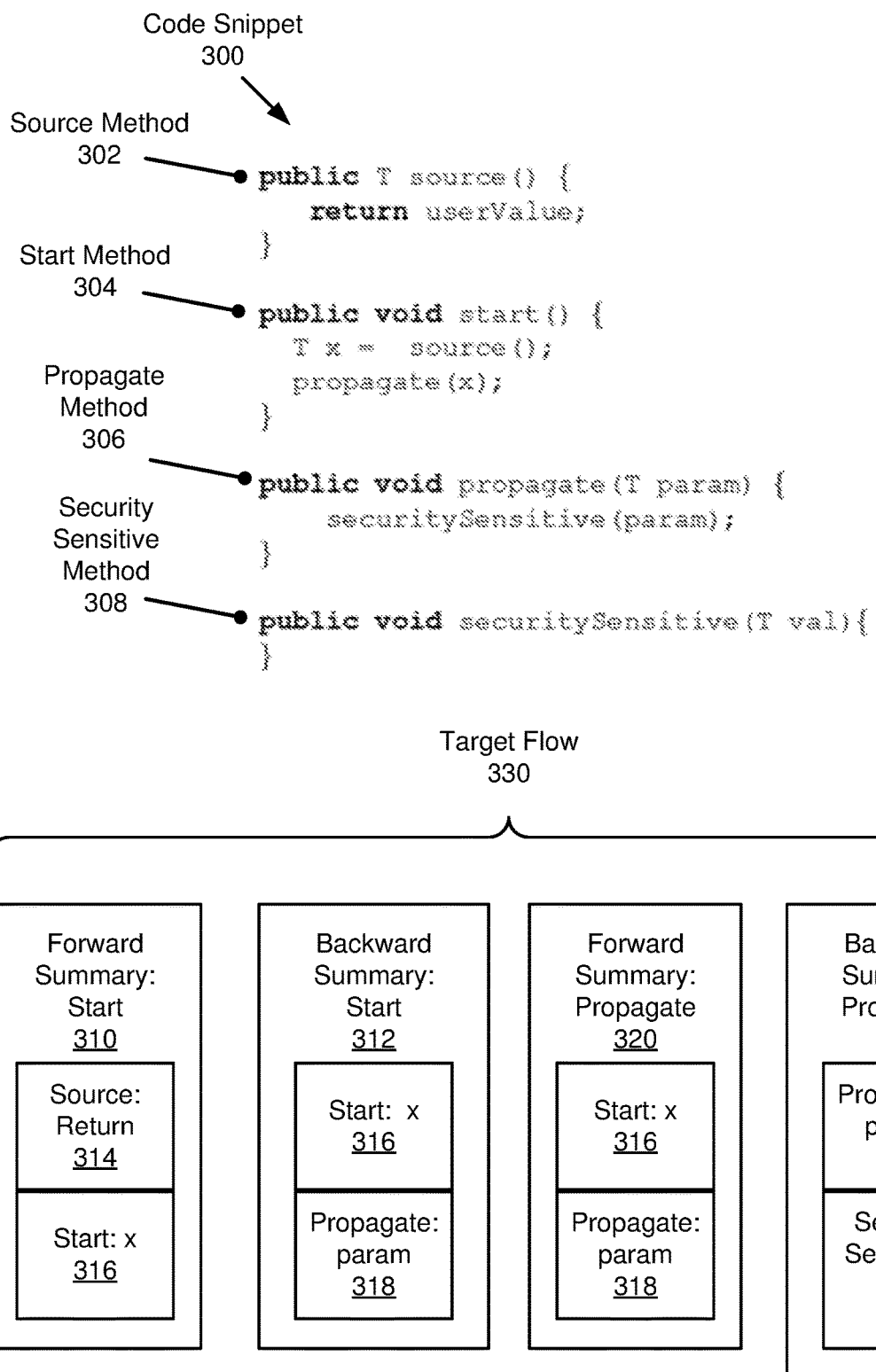
FIG. 3 and FIG. 4 show examples in accordance with one or more embodiments of the invention.
Figure 4:
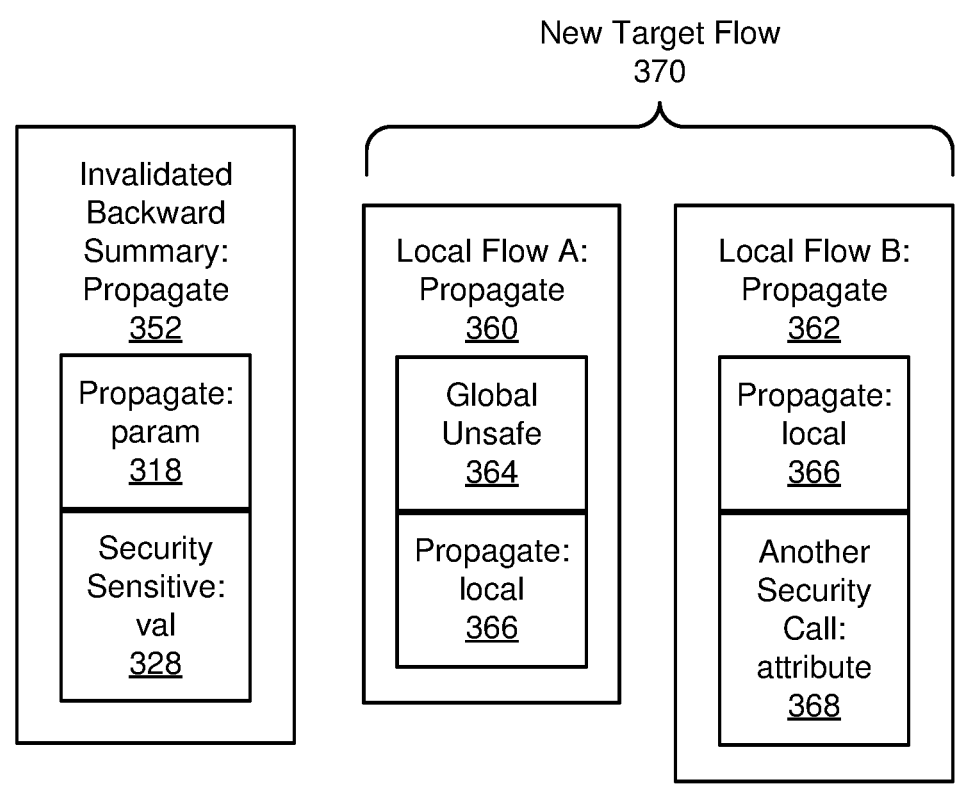

The following example is for explanatory purposes only and not intended to limit the scope of the invention. FIG. 3 and FIG. 4 show an implementation example in accordance with one or more embodiments of the invention. In FIG. 3, a code snippet (300) ((110) in FIG. 1A) includes several components (302, 304, 306, 308) ((112A, 112N) in FIG. 1A) that are methods. The source method (302) is a taint source, due to receiving a value from a user, and the securitySensitive method (308) accesses a security-sensitive resource of a computer system ((100) in FIG. 1A).

Initially, the code analyzer ((104) in FIG. 1A) generates forward and backward summaries for the methods. FIG. 3 shows that the forward summary for the start method (310) ((116) in FIG. 1A and FIG. 1B) includes a flow from the source method's tainted return value (314) to the start method's local parameter x (316). The backward summary for the start method (312) ((118) in FIG. 1A and FIG. 1B) includes a flow from the start method's local parameter x (316) to the propagate method's local (e.g., formal) parameter param (318).

FIG. 3 further shows that the forward summary for the propagate method (320) includes a flow from the start method's local parameter x (316) to the propagate method's local parameter param (318). The backward summary for the propagate method (322) includes a flow from the propagate method's local parameter param (318) to the securitySensitive method's local parameter val (324).

FIG. 3 further shows a target flow (330) ((180) in FIG. 1B) formed by combining the forward and backward summaries for the start method (310, 312) with the forward and backward summaries for the propagate method (320, 322). The target flow (330) corresponds to a defect relative to a taint analysis, since the source method's tainted return value (314) flows to the securitySensitive method's local parameter val (324).

Next, the code analyzer obtains a modification to the propagate method (352), as shown in the modified code snippet (350) of FIG. 4. The code analyzer determines that the backward summary of the modified propagate method (352) is invalid due to sanitization of the propagate method's parameter param (318) by the validate method (354). Thus, the propagate method's parameter param (318) is no longer tainted, which invalidates the target flow (330) of FIG. 3, so the defect corresponding to the target flow (330) no longer exists. However, the code analyzer identifies a new target flow (370) that includes new local flows (360, 362) within the modified propagate method (352).

FIG. 4 shows that the propagate method's local flow A (360) includes a flow from the globalUnsafe parameter (364) to an unnamed local parameter of the propagate method (366). The globalUnsafe parameter (364) is a potential taint source. FIG. 4 also shows that the propagate method's local flow B (362) includes a flow from the propagate method's local parameter (366) to the anotherSecurityCall method's local parameter attribute (368). Local flow A (360) and local flow B (362) form a target flow because the tainted globalUnsafe parameter (364) flows to the anotherSecurityCall method's local parameter attribute (368), since the anotherSecurityCall method (356) accesses a security-sensitive resource of the computer system.

Figure 5A:
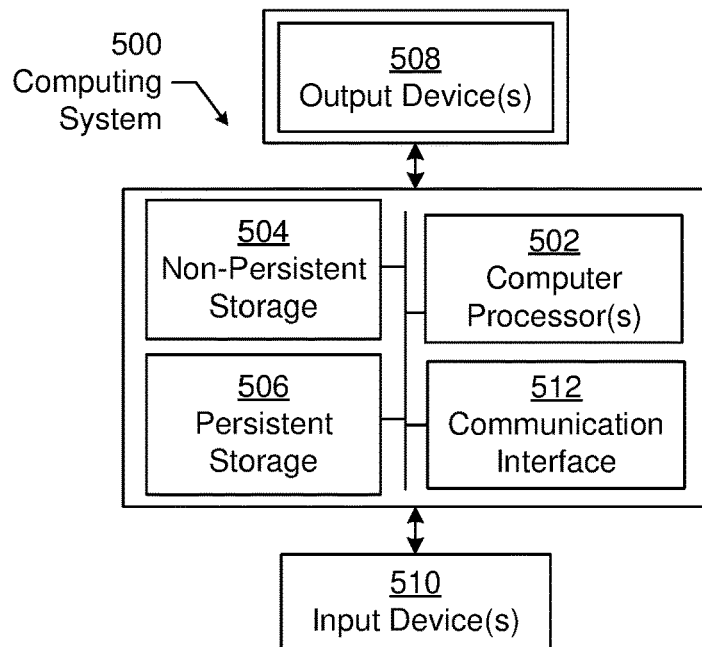
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
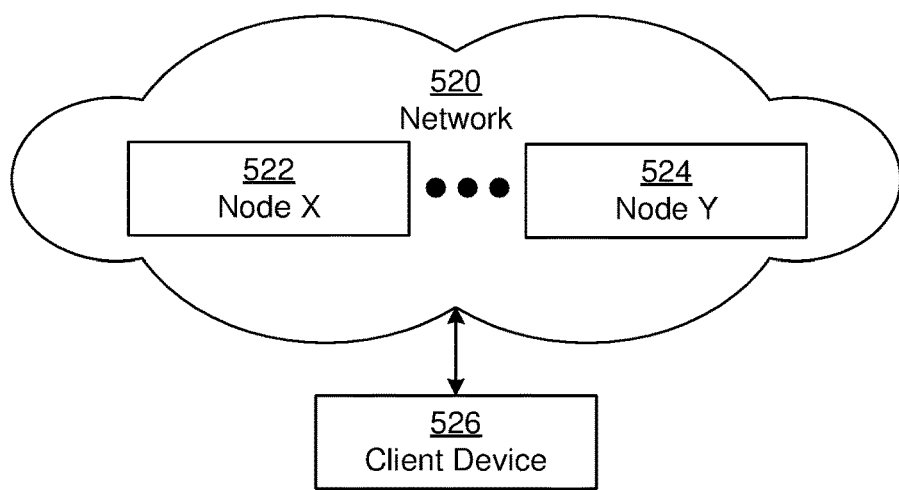

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
generating, by performing, using a target predicate, a full analysis of code and for each of a plurality of components of the code, a plurality of summaries comprising:
(i) a forward summary comprising a forward flow and
(ii) a backward summary comprising a backward flow;
obtaining a first modification to a modified component of the plurality of components;
determining that one of the plurality of summaries for the modified component is invalid by determining that the first modification modifies a statement that accesses a first parameter of the summary, wherein the first parameter comprises a target predicate status indicating whether the first parameter satisfies the target predicate; and
in response to determining that one of the plurality of summaries for the modified component is invalid:
obtaining the forward flow from the forward summary of the modified component;
obtaining the backward flow from the backward summary of the modified component;
generating a local flow by performing an incremental analysis of the modified component using the forward flow of the modified component and the backward flow of the modified component; and
detecting a defect in the code using the forward flow of the modified component, the local flow, and the backward flow of the modified component.

2. The method of claim 1,
wherein the forward flow of the forward summary comprises a forward external parameter and a forward local parameter,
wherein the forward external parameter satisfies the target predicate, and
wherein the backward flow of the backward summary comprises a backward local parameter and a backward external parameter.

3. The method of claim 2, further comprising:
generating a target flow comprising the forward flow of the modified component, the local flow, and the backward flow of the modified component;
obtaining a second modification to the modified component; and
determining that the second modification corrects the defect by invalidating the target flow.

4. The method of claim 2,
wherein the full analysis is a taint analysis,
wherein the forward external parameter flows, during execution of the code, to the forward local parameter,
wherein the backward local parameter flows, during execution of the code, to the backward external parameter, and
wherein the backward external parameter flows to a function that accesses a security-sensitive resource of a computer system.

5. The method of claim 2,
wherein the full analysis is an escape analysis,
wherein the forward local parameter flows, during execution of the code, to the forward external parameter,
wherein the backward external parameter flows, during execution of the code, to the backward local parameter, and
wherein the backward external parameter receives sensitive data from a function with elevated access privileges.

6. The method of claim 1,
wherein the target predicate status indicates, after performing the full analysis, that the first parameter satisfies the target predicate, and
wherein the target predicate status indicates, after performing the incremental analysis, that the first parameter does not satisfy the target predicate.

7. A system, comprising:
a memory coupled to a computer processor;
a repository configured to store code comprising a plurality of components each comprising a plurality of summaries comprising (i) a forward summary comprising a forward flow and (ii) a backward summary comprising a backward flow; and
a code analyzer, executing on the computer processor and using the memory, configured to:
generate the plurality of summaries for each of the plurality of components by performing, using a target predicate, a full analysis of the code,
obtain a first modification to a modified component of the plurality of components,
determine that one of the plurality of summaries for the modified component is invalid by determining that the first modification modifies a statement that accesses a first parameter of the summary, wherein the first parameter comprises a target predicate status indicating whether the first parameter satisfies the target predicate, and in response to determining that one of the plurality of summaries for the modified component is invalid:
obtain the forward flow from the forward summary of the modified component,
obtain the backward flow from the backward summary of the modified component,
generate a local flow by performing an incremental analysis of the modified component using the forward flow of the modified component and the backward flow of the modified component, and
detect a defect in the code using the forward flow of the modified component, the local flow, and the backward flow of the modified component.

8. The system of claim 7,
wherein the forward flow of the forward summary comprises a forward external parameter and a forward local parameter,
wherein the forward external parameter satisfies the target predicate, and
wherein the backward flow of the backward summary comprises a backward local parameter and a backward external parameter.

9. The system of claim 8,
wherein the full analysis is a taint analysis,
wherein the forward external parameter flows, during execution of the code, to the forward local parameter,
wherein the backward local parameter flows, during execution of the code, to the backward external parameter, and
wherein the backward external parameter flows to a function that accesses a security-sensitive resource of a computer system.

10. The system of claim 8,
wherein the full analysis is an escape analysis,
wherein the forward local parameter flows, during execution of the code, to the forward external parameter,
wherein the backward external parameter flows, during execution of the code, to the backward local parameter, and
wherein the backward external parameter receives sensitive data from a function with elevated access privileges.

11. The system of claim 7,
wherein the target predicate status indicates, after performing the full analysis, that the first parameter satisfies the target predicate, and
wherein the target predicate status indicates, after performing the incremental analysis, that the first parameter does not satisfy the target predicate.

12. The system of claim 7, wherein the code analyzer is further configured to:
generate a target flow comprising the forward flow of the modified component, the local flow, and the backward flow of the modified component;
obtain a second modification to the modified component; and
determine that the second modification corrects the defect by invalidating the target flow.

13. A non-transitory computer readable medium comprising instructions that, when executed by a computer processor, perform:
generating, by performing, using a target predicate, a full analysis of code and for each of a plurality of components of the code, a plurality of summaries comprising
(i) a forward summary comprising a forward flow and
(ii) a backward summary comprising a backward flow;
obtaining a first modification to a modified component of the plurality of components;
determining that one of the plurality of summaries for the modified component is invalid by determining that the first modification modifies a statement that accesses a first parameter of the summary, wherein the first parameter comprises a target predicate status indicating whether the first parameter satisfies the target predicate; and
in response to determining that one of the plurality of summaries for the modified component is invalid:
obtaining the forward flow from the forward summary of the modified component;
obtaining the backward flow from the backward summary of the modified component;
generating a local flow by performing an incremental analysis of the modified component using the forward flow of the modified component and the backward flow of the modified component; and
detecting a defect in the code using the forward flow of the modified component, the local flow, and the backward flow of the modified component.

14. The non-transitory computer readable medium of claim 13,
wherein the forward flow of the forward summary comprises a forward external parameter and a forward local parameter,
wherein the forward external parameter satisfies the target predicate, and
wherein the backward flow of the backward summary comprises a backward local parameter and a backward external parameter.

15. The non-transitory computer readable medium of claim 14, further comprising instructions that perform:
generating a target flow comprising the forward flow of the modified component, the local flow, and the backward flow of the modified component;
obtaining a second modification to the modified component; and
determining that the second modification corrects the defect by invalidating the target flow.

16. The non-transitory computer readable medium of claim 14,
wherein the full analysis is a taint analysis,
wherein the forward external parameter flows, during execution of the code, to the forward local parameter,
wherein the backward local parameter flows, during execution of the code, to the backward external parameter, and
wherein the backward external parameter flows to a function that accesses a security-sensitive resource of a computer system.

17. The non-transitory computer readable medium of claim 13,
wherein the target predicate status indicates, after performing the full analysis, that the first parameter satisfies the target predicate, and
wherein the target predicate status indicates, after performing the incremental analysis, that the first parameter does not satisfy the target predicate.

* * * * *